United States Patent
Li et al.

(10) Patent No.: US 12,264,071 B2
(45) Date of Patent: Apr. 1, 2025

(54) REACTOR, SYSTEM AND METHOD FOR CARBON-BASED MATERIAL POST-MODIFICATION

(71) Applicant: LINYUAN ADVANCED MATERIALS TECHNOLOGY CO., LTD., Kaohsiung (TW)

(72) Inventors: Jheng-Guang Li, Kaohsiung (TW); Cheng-Han Hsieh, Kaohsiung (TW); Te-Wang Ku, Kaohsiung (TW)

(73) Assignee: Linyuan Advanced Materials Technology Co., Ltd., Kaohsiung (TW)

( * ) Notice: Subject to any disclaimer, the term of this patent is extended or adjusted under 35 U.S.C. 154(b) by 610 days.

(21) Appl. No.: 17/731,835

(22) Filed: Apr. 28, 2022

(65) Prior Publication Data
US 2022/0348465 A1   Nov. 3, 2022

(30) Foreign Application Priority Data
Apr. 28, 2021   (TW) .................................. 110115315

(51) Int. Cl.
*C01B 32/168*   (2017.01)
*B01J 19/00*   (2006.01)
(Continued)

(52) U.S. Cl.
CPC ......... *C01B 32/168* (2017.08); *B01J 19/0053* (2013.01); *B01J 19/20* (2013.01); *C01B 32/194* (2017.08)

(58) Field of Classification Search
CPC ... C01B 32/168; C01B 32/194; C01B 32/354; B01J 19/0053; B01J 19/20; B01J 4/001;
(Continued)

(56) References Cited

U.S. PATENT DOCUMENTS 3,896,923 A * 7/1975 Griffith .................... B01J 4/001
414/218

OTHER PUBLICATIONS

Pal, et al., Dry Functionalization and Doping of Single-Walled Carbon Nanotubes by Ozone, J. Phys. Chem. C 2015; 119: 27821-27828 (Year: 2015).*

* cited by examiner

*Primary Examiner* — Daniel C. McCracken
(74) *Attorney, Agent, or Firm* — Cermak & McGowan LLP; Shelly Guest Cermak

(57) ABSTRACT

A carbon-based material post-modification reactor includes: a feeding port located upstream from the carbon-based material post-modification reactor and adapted to feed a carbon-based raw material into the reactor; a discharging port located downstream from the carbon-based material post-modification reactor and adapted to output a modified carbon-based material; and a screw conveying device disposed in the reactor to simultaneously convey and turn over the carbon-based raw material in the reactor, between the feeding port and the discharging port; and an intake device for inputting ozone gas to the interior of the carbon-based material post-modification reactor. The screw conveying device includes a shaft portion, reverse inner spiral blade group and forward outer spiral blade group. The screw conveying device simultaneously conveys forward, conveys reversely, and turns over the carbon-based raw material in the carbon-based material post-modification reactor, thereby enhancing the performance of post-modification reaction.

31 Claims, 11 Drawing Sheets

(51) Int. Cl.
*B01J 19/20* (2006.01)
*C01B 32/194* (2017.01)

(58) Field of Classification Search
CPC .. C09C 1/565; C09C 1/44; C09C 1/46; C09C 1/48; C09C 1/482; C09C 1/485; C09C 1/487; C09C 1/50; C09C 1/52; C09C 1/54; C09C 1/56; C09C 1/58; C09C 1/60
USPC .............................. 423/49.1–449.9, 450–459
See application file for complete search history.

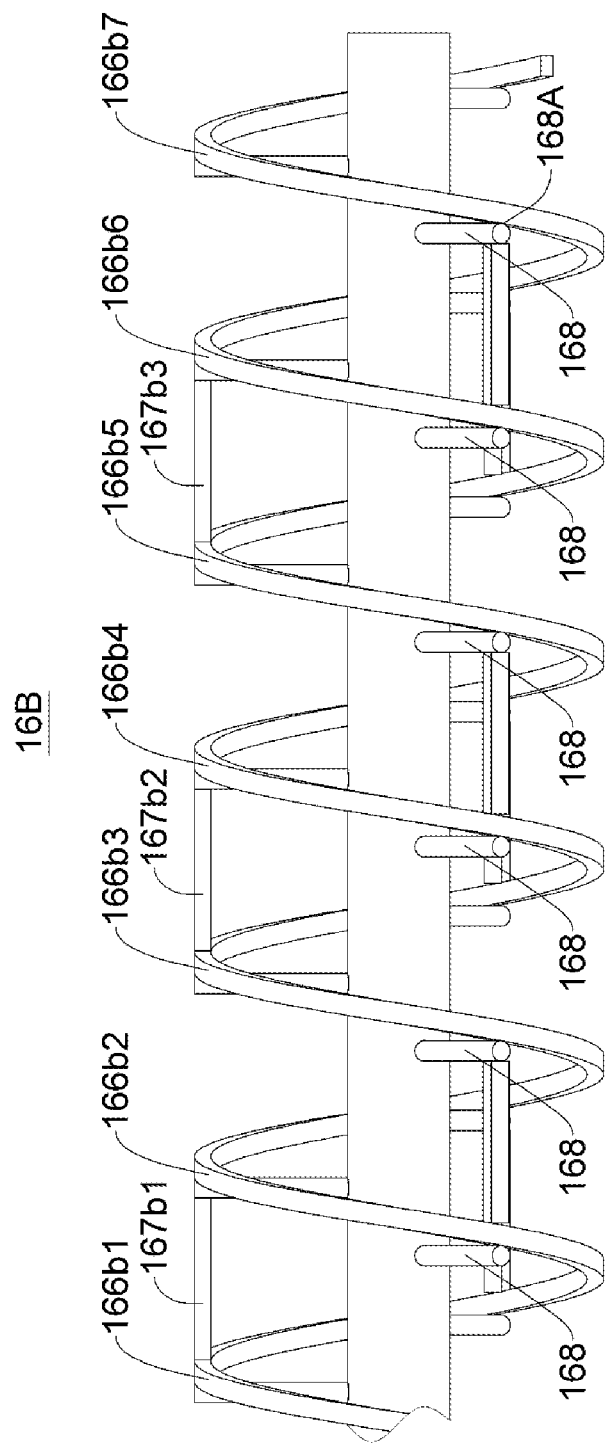

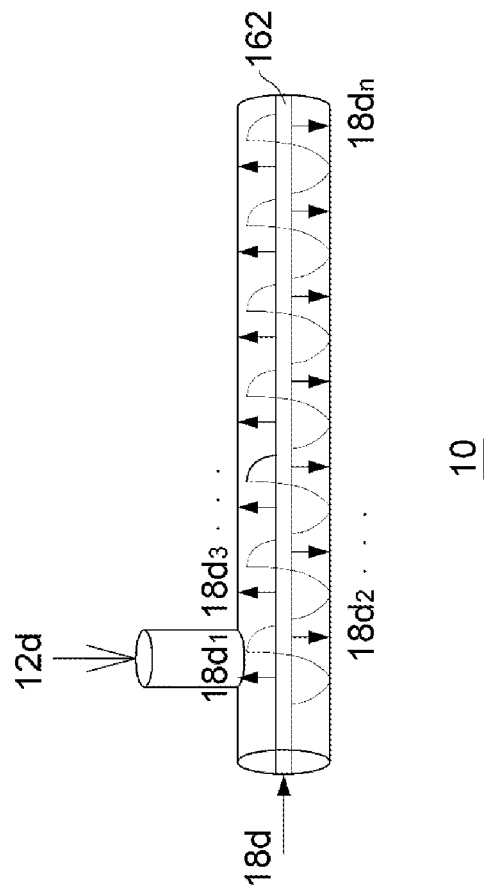
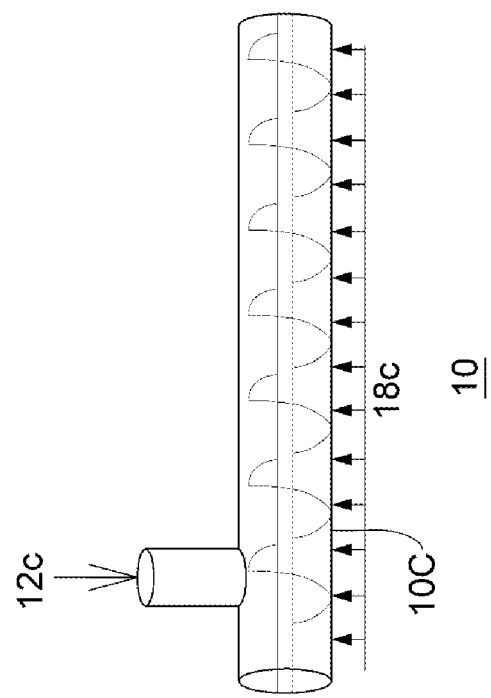

REACTOR, SYSTEM AND METHOD FOR CARBON-BASED MATERIAL POST-MODIFICATION

This application claims priority under 35 U.S.C. § 119 to Taiwanese Patent Application No. 110115315, filed Apr. 28, 2021, the entirety of which is incorporated by reference herein.

BACKGROUND OF THE INVENTION

Field of the Invention

The present disclosure relates to modification technology of carbon-based materials and, more particularly, to post-modification technology of carbon-based materials, such as carbon black, activated charcoal, carbon nanotubes, graphene and carbon fiber.

Description of the Prior Art

Carbon black is intrinsically lipophilic and demonstrates low dispersibility when present in polar solvents (for example, water), thereby having limited application. To extend the application of carbon black to related fields, such as ink, paint and electronic packaging, and thus broaden its application to thereby increase its application value, its manufacturing process entails performing surface oxidation modification processing on carbon black and thus enhancing the dispersion performance of carbon black to thereby allow the modified carbon black to disperse throughout polar solvents steadily and satisfactorily.

According to prior art, modification procedures of carbon black are mostly carried out in the course of manufacturing carbon black by introducing hydrogen peroxide to a manufacturing process to start a reaction in order to increase oxygen-containing polar groups of the carbon black produced. Alternatively, after its production, carbon black is treated with a strong acid (for example, hydrochloric acid and nitric acid) solution or ozone plasma in order to undergo post-modification processing, such as surface acidification and surface oxidation. Using strong acid solutions to carry out post-modification processing to carbon black inevitably leads to issues, such as treating and discharging severely polluted waste liquid. On the other hand, using ozone plasma to carry out post-modification processing to carbon black is disadvantaged by low efficiency because of low ozone plasma concentration. Furthermore, existing carbon black post-modification techniques always require a blender operating in a reaction tank and entail performing surface modification of carbon black in batches; thus, the existing carbon black post-modification techniques have two drawbacks: low efficiency, production yield and economic value; and inconsistent quality of the modified carbon black due to differences between conditions for batch processing. As a result, the issue with severely polluted waste liquid will not go away even if continuous processing is carried out with a fluidized bed. Furthermore, carbon-based material, such as activated charcoal, carbon nanotubes, graphene and carbon fiber, requires post-modification technology conducive to enhancing processing efficiency and capable of producing high-quality modified carbon-based material.

SUMMARY OF THE INVENTION

In view of the aforesaid drawbacks of the prior art, the present disclosure provides a carbon-based material post-modification reactor, comprising the post-modification reactor for executing a carbon-based material post-modification processing system and method. According to the present disclosure, a produced carbon-based raw material, such as carbon black, activated charcoal, carbon nanotubes, graphene and carbon fiber, undergoes post-modification processing in a continuous manufacturing process to effectively enhance the quality of the modified carbon-based material and its production efficiency.

A first embodiment of the present disclosure provides a carbon-based material post-modification reactor comprising: a feeding port located at a point upstream from the carbon-based material post-modification reactor and adapted to feed a carbon-based raw material into the reactor; a discharging port located at a point downstream from the carbon-based material post-modification reactor and adapted to output a modified carbon-based material; a screw conveying device disposed in the carbon-based material post-modification reactor to simultaneously convey and turn over the carbon-based raw material admitted by the feeding port, between the feeding port and the discharging port; and an intake device for inputting ozone gas to the interior of the carbon-based material post-modification reactor. The screw conveying device comprises: a shaft portion coupled to a motor and driven by the motor; an inner spiral blade group comprising a plurality of inner spiral blades disposed equidistantly at a first portion of the shaft portion and extended radially from the shaft portion, wherein the first portion of the shaft portion is positioned proximate to the feeding port; and an outer spiral blade group comprising a plurality of short rods and a plurality of outer spiral blades. The plurality of short rods are disposed equidistantly at the shaft portion and extended radially from the shaft portion. The plurality of outer spiral blades surround spirally around the shaft portion and are disposed equidistantly at the shaft portion. The plurality of short rods each have an end connected to a corresponding one of the plurality of outer spiral blades.

According to the aforesaid embodiment, the outer spiral blade group further comprises a part of a plurality of connection blades each connected between at least two outer spiral blades of the outer spiral blade group.

According to the aforesaid embodiment, the inner spiral blade group is a right-hand turning spiral blade group, and the outer spiral blade group is a left-hand turning spiral blade group.

According to the aforesaid embodiment, the outer spiral blade group has a first inter-blade distance, and the inner spiral blade group has a second inter-blade distance greater than the first inter-blade distance. Preferably, the first inter-blade distance ranges from 80 mm to 120 mm, and the second inter-blade distance ranges from 100 mm to 150 mm.

According to the aforesaid embodiment, the shaft portion is of a length ranging from 1500 mm to 15000 mm. Preferably, the first portion of the shaft portion is of a length ranging from 1000 mm to 10000 mm.

According to the aforesaid embodiment, the carbon-based material post-modification reactor is of an aspect ratio ranging from 3 to 8.

According to the aforesaid embodiment, regarding the carbon-based material post-modification reactor, the plurality of inner spiral blades of the inner spiral blade group each has a diameter ranging from 90 mm to 170 mm.

According to the aforesaid embodiment, regarding the carbon-based material post-modification reactor, a first inner spiral blade among the plurality of inner spiral blades and a front end of the shaft portion are separated by a first distance ranging from 0 to two-thirds of the length of the shaft portion.

According to the aforesaid embodiment, the intake device comprises a plurality of injection holes, and ozone gas from the intake device reaches the interior of the carbon-based material post-modification reactor via the plurality of injection holes.

According to the aforesaid embodiment, the intake device is disposed at an end of the carbon-based material post-modification reactor, below the feeding port in the carbon-based material post-modification reactor, or below the carbon-based material post-modification reactor, or forms from the shaft portion directly.

According to the aforesaid embodiment, the carbon-based material post-modification reactor of the present disclosure further comprises a temperature control device coupled to the carbon-based material post-modification reactor to regulate temperature inside the carbon-based material post-modification reactor.

According to the aforesaid embodiment, the carbon-based raw material is one of carbon black, activated charcoal, carbon nanotubes, graphene and carbon fiber.

A second embodiment of the present disclosure provides a carbon-based material post-modification reaction device comprising: a general feeding port located at a point upstream from the carbon-based material post-modification reaction device and adapted to feed a carbon-based raw material into the reaction device; a general discharging port located at a point downstream from the carbon-based material post-modification reaction device and adapted to output a modified carbon-based material; and the plurality of carbon-based material post-modification reactors as described above, wherein the discharging port of an upstream one of the plurality of carbon-based material post-modification reactors is connected to the feeding port of a downstream one of the plurality of carbon-based material post-modification reactors, wherein, between the general feeding port and the general discharging port, the plurality of carbon-based material post-modification reactors are connected in series, in fluid communication with each other, coupled to and driven by the motors, respectively, to simultaneously convey and turn over the carbon-based raw material in the carbon-based material post-modification reactors.

According to the aforesaid embodiment, the respective intake devices of the plurality of carbon-based material post-modification reactors are fluidically coupled to a common ozone producing unit.

According to the aforesaid embodiment, the carbon-based raw material is one of carbon black, activated charcoal, carbon nanotubes, graphene and carbon fiber.

A third embodiment of the present disclosure provides a carbon-based material post-modification processing system comprising: an air compression unit for receiving and compressing air to produce a compressed air; an oxygen gas producing unit for receiving the compressed air and producing a concentrated oxygen gas from the compressed air; an ozone producing unit for receiving the concentrated oxygen gas and producing an ozone gas from the concentrated oxygen gas; and a modification unit for receiving the ozone gas produced by the ozone producing unit and causing combination of the ozone gas and a carbon-based raw material and reaction therebetween to produce a modified carbon-based material.

According to the aforesaid embodiment, the modification unit comprises the carbon-based material post-modification reactor according to any aforesaid embodiment or comprises the carbon-based material post-modification reaction device according to any aforesaid embodiment.

According to the aforesaid embodiment, the carbon-based material post-modification processing system of the present disclosure further comprises a drying unit disposed between the air compression unit and the oxygen gas producing unit to dry the compressed air.

According to the aforesaid embodiment, the carbon-based material post-modification processing system of the present disclosure further comprises an air tank disposed between the drying unit and the oxygen gas producing unit to store the dried compressed air.

According to the aforesaid embodiment, the oxygen gas producing unit is a molecular sieve device for separating the oxygen gas and nitrogen gas in the compressed air to produce the concentrated oxygen gas.

According to the aforesaid embodiment, the carbon-based material post-modification processing system of the present disclosure further comprises an oxygen gas tank disposed between the oxygen gas producing unit and the ozone producing unit to store the concentrated oxygen gas.

According to the aforesaid embodiment, the ozone producing unit is a high-voltage discharge device.

According to the aforesaid embodiment, the carbon-based material post-modification processing system of the present disclosure further comprises a feeding device for feeding the carbon-based raw material into the modification unit.

According to the aforesaid embodiment, the carbon-based material post-modification processing system of the present disclosure further comprises a grinding device for grinding the modified carbon-based material outputted from the modification unit.

According to the aforesaid embodiment, the carbon-based raw material is one of carbon black, activated charcoal, carbon nanotubes, graphene and carbon fiber.

A fourth embodiment of the present disclosure provides a carbon-based material post-modification processing method, comprising the steps of: (a) providing a compressed air; (b) separating a concentrated oxygen gas from the compressed air; (c) producing an ozone gas from the concentrated oxygen gas by high-voltage discharge; and (d) causing the ozone gas to pass through a carbon-based raw material and combine and react with the carbon-based raw material for a predetermined time period to produce a modified carbon-based material.

According to the aforesaid embodiment, after step (a), the method of the present disclosure further comprises a step (a1) of drying and/or storing the compressed air.

According to the aforesaid embodiment, after step (b), the method of the present disclosure further comprises a step (b1) of storing the concentrated oxygen gas.

According to the aforesaid embodiment, after step (c), the method of the present disclosure further comprises a step (c1) of controlling flow rate and/or concentration of the ozone gas passing through the carbon-based raw material.

According to the aforesaid embodiment, the carbon-based raw material is one of carbon black, activated charcoal, carbon nanotubes, graphene and carbon fiber.

BRIEF DESCRIPTION OF THE DRAWINGS

Technical features of the present disclosure are hereunder illustrated with embodiments, depicted with accompanying drawings, and described below. However, the accompanying drawings and description are illustrative rather than restrictive of the present disclosure.

FIG. 2A and FIG. 2B are schematic views of a first segment and a second segment of a screw conveying device of the carbon-based material post-modification reactor according to an embodiment of the present disclosure, respectively.

FIG. 4A through FIG. 4D are schematic views of the intake device mounted on the carbon-based material post-modification reactor in terms of its position and intake method according to an embodiment of the present disclosure, respectively.

DETAILED DESCRIPTION OF THE EMBODIMENTS

Figure 1:
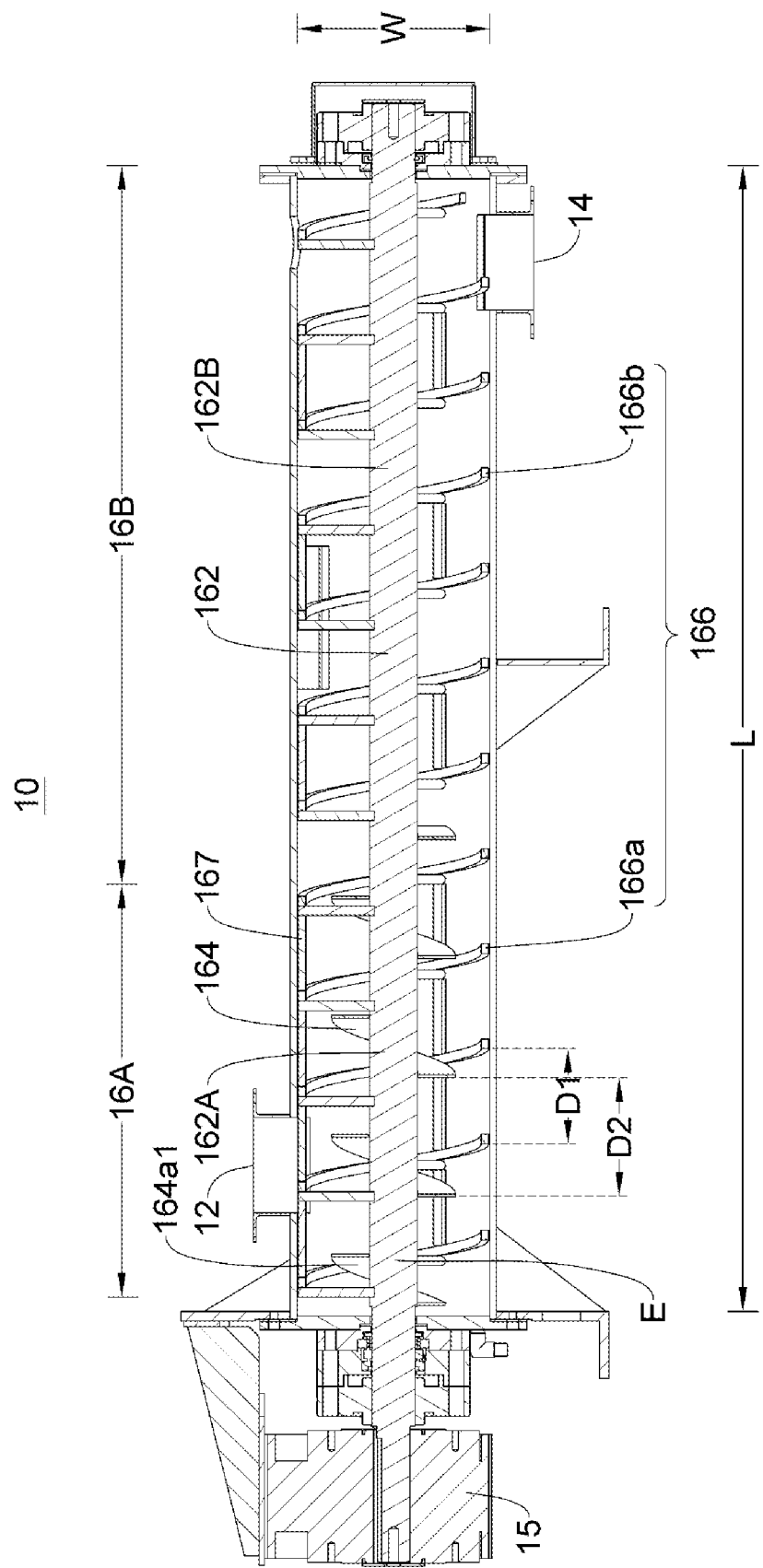
FIG. 1 is a cross-sectional view of a carbon-based material post-modification reactor according to an embodiment of the present disclosure.

Concepts embodied in the present disclosure are depicted by drawings, illustrated by embodiments and described below. In the drawings and description, similar or identical constituent elements are denoted by identical reference numerals. The drawings serve an illustrative purpose and are not drawn to scale.

Referring to FIG. 1, there is shown a cross-sectional view of a carbon-based material post-modification reactor 10 according to an embodiment of the present disclosure. The carbon-based material post-modification reactor 10 of the present disclosure comprises a feeding port 12. The feeding port 12 is located at a point upstream from the carbon-based material post-modification reactor 10. A carbon-based raw material (not shown) intended to be modified is fed into the interior of the carbon-based material post-modification reactor 10 via the feeding port 12. The carbon-based material post-modification reactor 10 of the present disclosure further comprises a discharging port 14. The discharging port 14 is located at a point downstream from the carbon-based material post-modification reactor 10, allowing a resultant modified carbon-based material (not shown) to be outputted from the discharging port 14 and then undergo a grinding and/or packaging process as needed. According to the present disclosure, the carbon-based raw material is any one of carbon black, activated charcoal, carbon nanotubes, graphene and carbon fiber.

According to the present disclosure, the carbon-based material post-modification reactor 10 has therein a screw conveying device 16. The screw conveying device 16 simultaneously conveys and turns over the carbon-based raw material admitted by the feeding port 12 between the feeding port 12 and the discharging port 14. As shown in the diagram, the screw conveying device 16 comprises a first segment 16A upstream from the reactor and a second segment 16B downstream from the reactor. Thus, the first segment 16A of the screw conveying device 16 is closer to the feeding port 12 of the carbon-based material post-modification reactor 10 than the second segment 16B.

As shown in FIG. 1, according to the present disclosure, the screw conveying device 16 of the carbon-based material post-modification reactor 10 comprises a shaft portion 162, an inner spiral blade group 164 and an outer spiral blade group 166.

The shaft portion 162 is coupled to a motor 15 and driven by the motor 15, such that the screw conveying device 16 simultaneously conveys and turns over the carbon-based raw material admitted by the feeding port 12 and existing within the carbon-based material post-modification reactor 10. The shaft portion 162 is divided into a first portion 162A and a second portion 162B which correspond in position to the first segment 16A and the second segment 16B of the screw conveying device 16, respectively. Thus, the first portion 162A of the shaft portion 162 is located upstream from the carbon-based material post-modification reactor 10 and is closer to the feeding port 12 than the second portion 162B, whereas the second portion 162B of the shaft portion 162 is located downstream from the carbon-based material post-modification reactor 10 and is closer to the discharging port 14 than the first portion 162A.

Figure 2A:
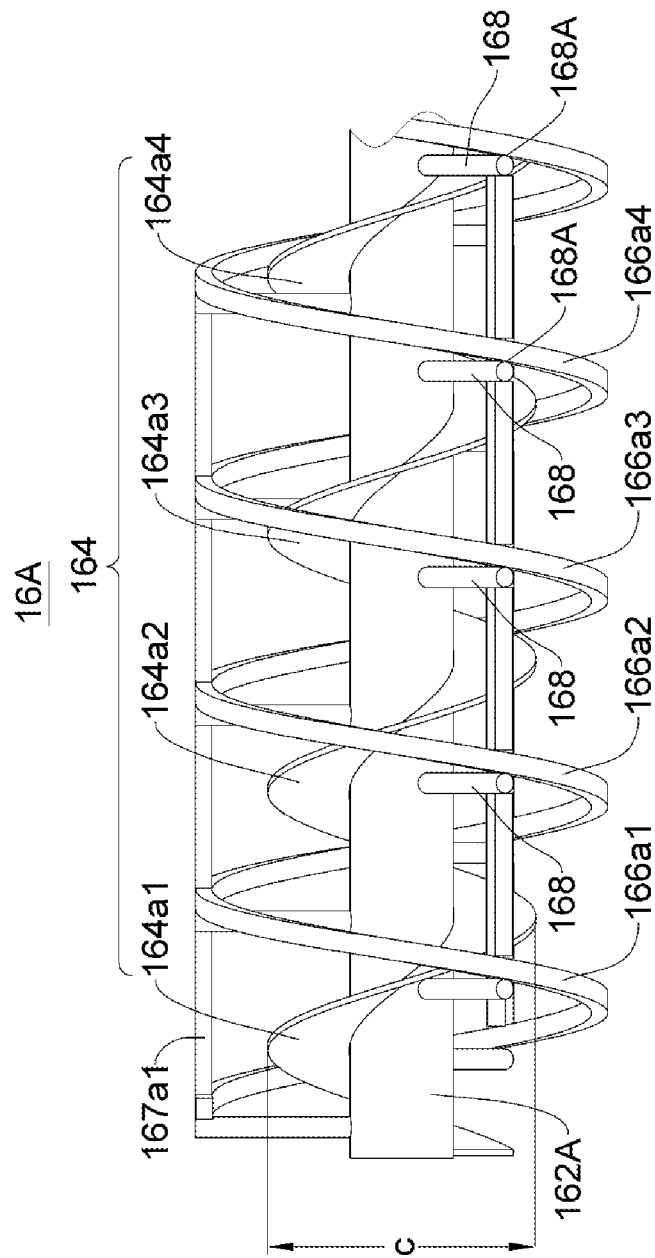

Referring to FIG. 2A, there is shown a schematic view of the first segment 16A of the screw conveying device 16 of the carbon-based material post-modification reactor 10 according to the present disclosure. As shown in the diagram, the inner spiral blade group 164 has a continuous spiral structure and comprises a plurality of inner spiral blades 164a1~164a4. The inner spiral blades 164a1~164a4 are disposed on the first portion 162A of the shaft portion 162, spaced apart equidistantly, and extended radially from the shaft portion 162. In this embodiment, the inner spiral blade group 164 consists of four (i.e., four circles of) inner spiral blades 164a1~164a4. However, in another embodiment, the number (i.e., number of circles) of inner spiral blades is adjustable in accordance with an actual application condition and production need. In an embodiment of the present disclosure, the inner spiral blade group 164 is a right-hand turning (i.e., reversely turning) spiral blade group and is confined to the first portion 162A of the shaft portion 162. Thus, the reversely turning inner spiral blade group 164 is confined to the first segment 16A in the screw conveying device 16. When driven by the shaft portion 162, the reversely turning inner spiral blade group 164 reversely conveys the carbon-based raw material in the first segment 16A to an upstream point to increase the time period during which the carbon-based raw material stays in the carbon-based material post-modification reactor 10 of the present disclosure.

In this embodiment, the inner spiral blade group 164 is disposed at the first portion 162A of the shaft portion 162, and the first inner spiral blade 164a1 is disposed at front end E of the shaft portion 162 of the screw conveying device 16 in the carbon-based material post-modification reactor 10, as shown in FIG. 1. However, in another embodiment, the inner spiral blade group is disposed at a different point on the shaft portion, for example, at any point between the shaft portion front end and a point separated from the shaft portion front end by a distance equivalent to two-thirds of the total length of the shaft portion, as needed.

In this embodiment, the inner spiral blades 164a1~164a4 of the inner spiral blade group 164 each have a diameter c (shown in FIG. 2A) of 130 mm, for example. However, in another embodiment, the diameter of the inner spiral blades is adjustable and ranges from 90 mm to 170 mm, for example, depending on the design of the reactor.

Refer to FIG. 1, FIG. 2A and FIG. 2B. FIG. 2B is a schematic view of the second segment 16B of the screw conveying device 16 of the carbon-based material post-modification reactor 10 according to the present disclosure. As shown in the diagram, the outer spiral blade group 166 of the screw conveying device 16 comprises a plurality of short rods 168 and a plurality of outer spiral blades 166a, 166b. The plurality of short rods 168 are disposed equidistantly at the entire shaft portion 162 (comprising the first portion 162A and second portion 162B) and extended radially from the shaft portion 162. The plurality of outer spiral blades 166a, 166b have a continuous spiral structure each, surround the shaft portion 162, and are disposed equidistantly on the first portion 162A and second portion 162B of the shaft portion 162. In an embodiment of the present disclosure, the outer spiral blade group 166 is a left-hand turning spiral blade group, and the outer spiral blades 166a, 166b are each connected to one end 168A of a corresponding one of the short rods 168 (for example, by welding), thereby forming a forward turning spiral blade structure surrounding the shaft portion 162 to convey the carbon-based raw material in the carbon-based material post-modification reactor 10 toward a downstream point.

As shown in FIG. 1, the carbon-based material post-modification reactor 10 in an embodiment of the present disclosure is horizontally positioned. In this embodiment, the feeding port 12 located at a point upstream from the carbon-based material post-modification reactor 10 is on the left in the diagram, whereas the discharging port 14 located at a point downstream from the carbon-based material post-modification reactor 10 is on the right in the diagram. As mentioned before, in this embodiment, the outer spiral blade group 166 comprises outer spiral blades 166a and outer spiral blades 166b disposed in the first segment 16A and second segment 16B of the screw conveying device 16, respectively, and has a forward turning spiral blade structure, for example, a left-hand turning spiral blade group. Since the motor 15 drives the shaft portion 162 to axially rotate, the outer spiral blade group 166 is driven to convey the carbon-based raw material in the carbon-based material post-modification reactor 10 in the direction of the discharging port 14 (the discharging port 14 is a downstream point, and the direction is the rightward direction in FIG. 1). In this embodiment, the first segment 16A of the screw conveying device 16 further comprises an inner spiral blade group 164 with a plurality of inner spiral blades 164a which are reversely turning spiral blades. The inner spiral blade group 164 is, for example, a right-hand turning spiral blade group. Since the motor 15 drives the shaft portion 162 to rotate axially, the inner spiral blade group 164 is driven to convey the carbon-based raw material in the direction of the feeding port 12 (the feeding port 12 is an upstream point, and the direction is the leftward direction in FIG. 1, allowing the carbon-based raw material to be conveyed in a reverse direction), so as to control the time period (reaction time) during which the carbon-based raw material stays in the carbon-based material post-modification reactor 10 of the present disclosure.

In this embodiment, the outer spiral blade group 166 of the screw conveying device 16 further comprises a plurality of connection blades 167. The plurality of connection blades 167 are each connected between at least two blades of the outer spiral blade group 166a, 166b. For instance, as shown in FIG. 1 and FIG. 2A, FIG. 2B, a connection blade 167a1 is connected between blades 166a1~166a4 of the outer spiral blade group 166 of the first segment 16A of the screw conveying device 16. In the second segment 16B of the screw conveying device 16, the connection blades 167b1~167b3 are connected between two adjacent blades (for example, blade 166b1 and blade 166b2, blade 166b3 and blade 166b4, and blade 166b5 and blade 166b6) of the outer spiral blade group 166, respectively. According to the present disclosure, with the shaft portion 162 being axially rotated by the motor 15, the connection blades 167 of the screw conveying device 16 are driven to turn over the carbon-based raw material in the carbon-based material post-modification reactor 10 and thus mix the carbon-based raw material and ozone in the reactor, thereby enhancing their reaction efficiency.

In this embodiment, the outer spiral blade group 166 of the screw conveying device 16 has a first inter-blade distance D1, whereas the inner spiral blade group 164 of the screw conveying device 16 has a second inter-blade distance D2, wherein the first inter-blade distance D1 is less than the second inter-blade distance D2. Thus, according to an embodiment of the present disclosure, in the screw conveying device 16 of the carbon-based material post-modification reactor 10, the inter-blade distance D1 of the outer spiral blade group 166 for forwardly conveying the carbon-based raw material is less than the inter-blade distance D2 of the inner spiral blade group 164 for reversely conveying the carbon-based raw material.

According to the present disclosure, the inter-blade distances D1, D2 of the outer spiral blade group 166 and inner spiral blade group 164 of the screw conveying device 16 of the carbon-based material post-modification reactor 10, the length of the first segment 16A, the length of the second segment 16B, and the length of the connection blades 167 are designed and adjusted according to the actual needs for the manufacturing process. For instance, according to an embodiment of the present disclosure, regarding the carbon-based material post-modification reactor 10, the first inter-blade distance D1 ranges from 80 mm to 120 mm, whereas the second inter-blade distance ranges from 100 mm to 150 mm. According to an embodiment of the present disclosure, the first segment has a length ranging from 1000 mm to 10000 mm, and the sum of the length of the first segment and the length of the second segment (i.e., the total length of the screw conveying device) ranging from 1500 mm to 15000 mm. For instance, in this embodiment, the inter-blade distance D1 of the outer spiral blade group 166 is, for example, 100 mm, whereas the inter-blade distance D2 of the inner spiral blade group 164 is, for example, 125 mm. Furthermore, the total length of the first segment 16A of the screw conveying device 16 is, for example, 1000 mm, and the length of the connection blades 167a1 is, for example, 605 mm.

According to the present disclosure, the carbon-based material post-modification reactor 10 has an aspect ratio ranging from 3 to 8. For instance, in this embodiment, the carbon-based material post-modification reactor 10 has a total length L of 1500 mm and a width W (inner diameter of the reactor) of 212.3 mm, with an aspect ratio (L/D) of around 7.06.

Figure 3:
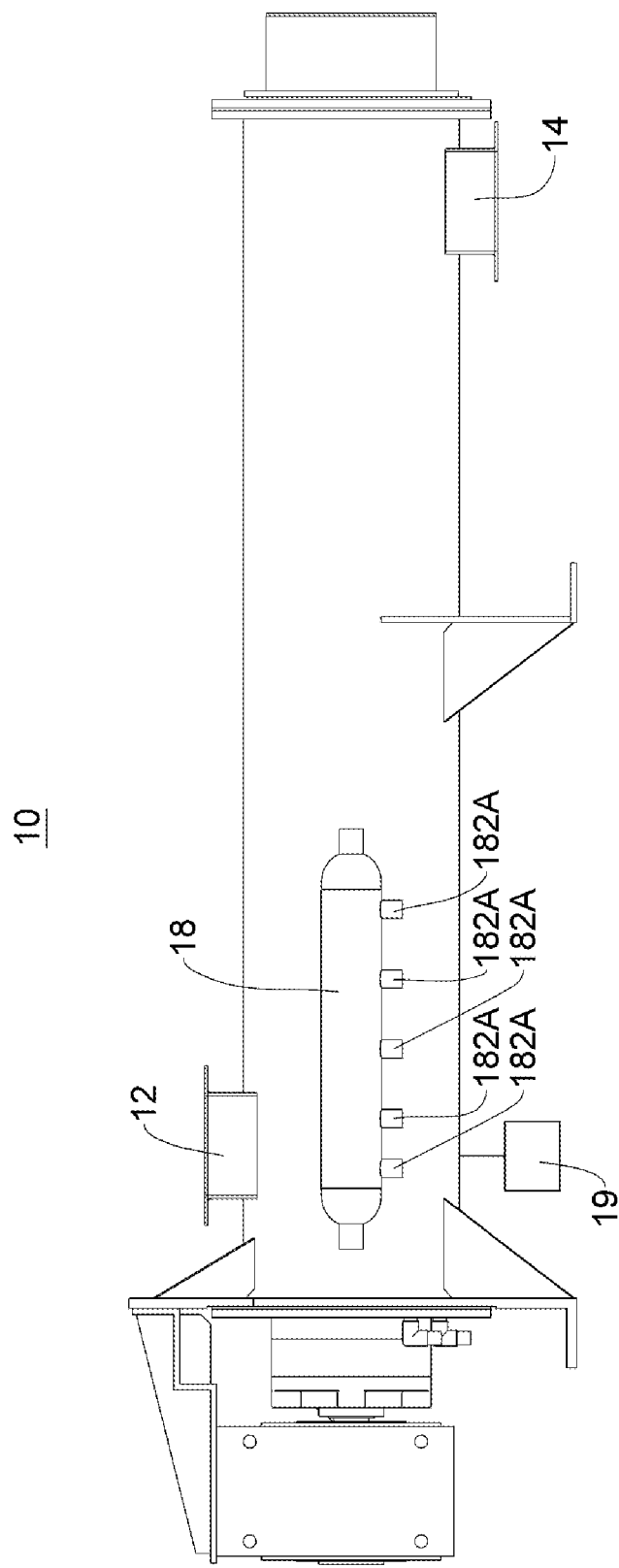
FIG. 3 is a schematic view of an intake device mounted on the carbon-based material post-modification reactor according to an embodiment of the present disclosure.

According to the present disclosure, the carbon-based material post-modification reactor further comprises an intake device, such that ozone gas is inputted to the interior of the carbon-based material post-modification reactor through the intake device to mix and react with the carbon-based raw material. Referring to FIG. 3, there is shown a schematic view of an intake device mounted on the carbon-based material post-modification reactor according to an embodiment of the present disclosure. According to an embodiment of the present disclosure, the intake device 18 of the carbon-based material post-modification reactor 10 is disposed inside the carbon-based material post-modification reactor 10 and below the feeding port 12 and further comprises a plurality of (for example, five in this embodiment) injection holes 182A, as shown in FIG. 3. The ozone gas inputted via the intake device 18 enters the carbon-based material post-modification reactor 10 through the injection holes 182A. Therefore, the uniformity of dispersion of the ozone gas in the carbon-based material post-modification reactor 10 is enhanced, and the ozone gas is better mixed with the carbon-based raw material to augment the efficiency of the reaction therebetween. Furthermore, the carbon-based material post-modification reactor 10 of the present disclosure further comprises a temperature control device 19. The temperature control device 19 is coupled to the carbon-based material post-modification reactor 10 to regulate the temperature inside (for example, by heating up) the carbon-based material post-modification reactor 10, so as to enhance the reaction efficiency of the reaction between the ozone gas and the carbon-based raw material.

Figure 4B:
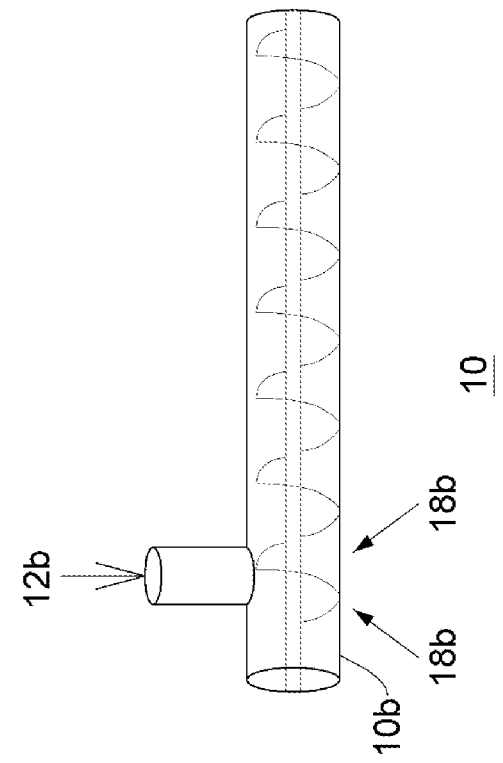
Figure 4A:
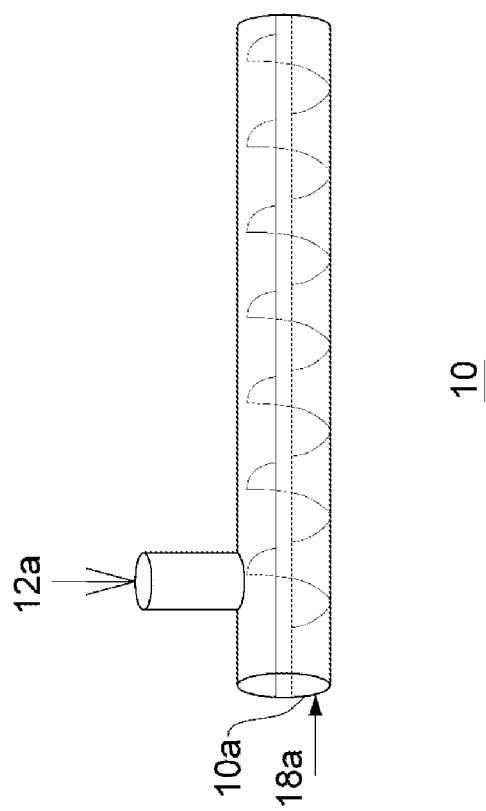

The intake device is disposed inside the carbon-based material post-modification reactor 10. According to the present disclosure, the position of the intake device and the way of mounting the intake device in place may be subject to changes to meet actual needs for a manufacturing process. For instance, referring to FIG. 4A through FIG. 4D, there are shown schematic views of the intake device mounted on the carbon-based material post-modification reactor in terms of its position and intake method according to an embodiment of the present disclosure, respectively. In an embodiment of the present disclosure, the intake device is disposed at an end 10a of the carbon-based material post-modification reactor 10, such that the ozone enters the carbon-based material post-modification reactor 10 through the end 10a, as indicated by arrow 18a in FIG. 4A, to thereby mixing and reacting with the carbon-based raw material (indicated by arrow 12a) admitted by the feeding port 12 and existing in the reactor. Alternatively, the intake device is disposed at an end 10b (FIG. 4B) of the lower portion of the carbon-based material post-modification reactor 10 or disposed along a lower portion 10c of the carbon-based material post-modification reactor 10 (FIG. 4C), such that the ozone enters the carbon-based material post-modification reactor 10 via the end 10b of the lower portion of the carbon-based material post-modification reactor or the lower portion 10c of the carbon-based material post-modification reactor as indicated by arrow 18b in FIG. 4B and arrow 18c in FIG. 4C, so as to mix and react with the carbon-based raw material (indicated by arrows 12b, 12c) admitted by the feeding port 12 and existing in the reactor. In yet another alternative embodiment, the intake device is formed from the shaft portion 162 with a plurality of injection holes, such that the ozone axially admitted from the shaft portion 162 enters the carbon-based material post-modification reactor 10 evenly through the injection holes on the shaft portion 162, as indicated by arrows 18d, 18d1 to 18dn in FIG. 4D, to mix and react with the carbon-based raw material (indicated by arrow 12d) admitted by the feeding port 12 and existing in the reactor.

Figure 5C:
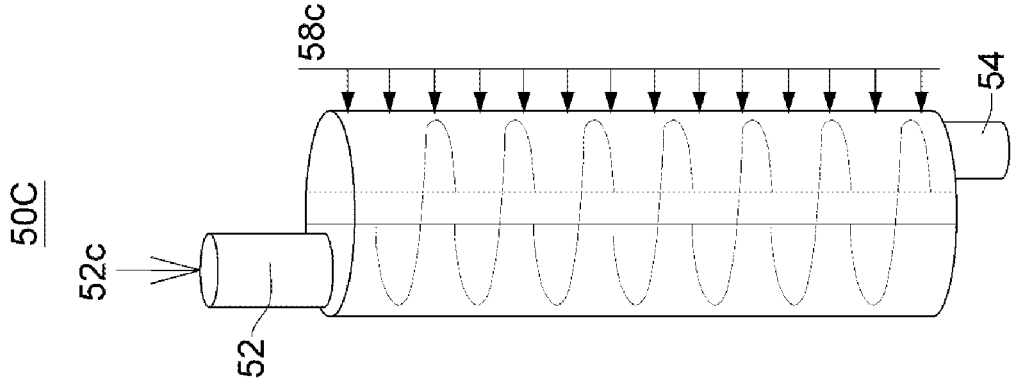
FIG. 5A through FIG. 5C are schematic views of the carbon-based material post-modification reactor and the intake device mounted thereon according to another embodiment of the present disclosure, respectively.
Figure 5B:
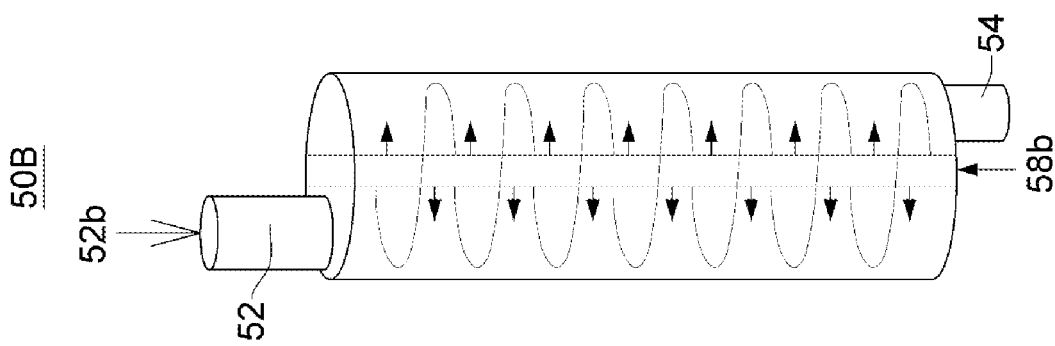
Figure 5A:
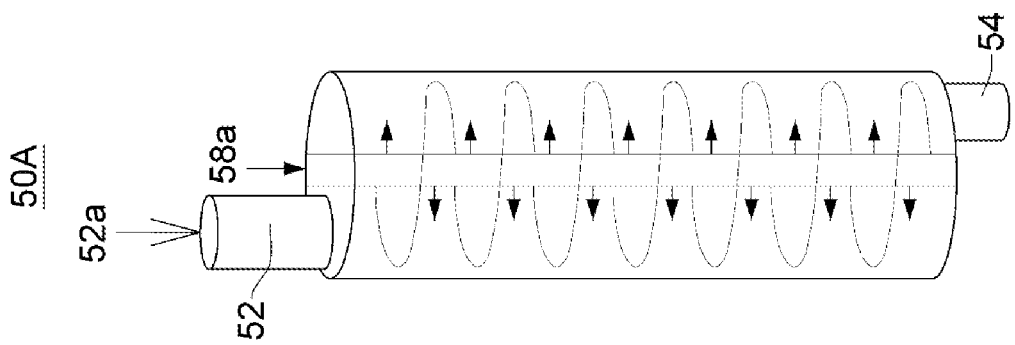

As mentioned before, the carbon-based material post-modification reactor 10 shown in FIG. 1 is horizontally positioned, but the carbon-based material post-modification reactor of the present disclosure is not limited thereto. For instance, as shown in FIG. 5A through FIG. 5C, the carbon-based material post-modification reactor 50A, 50B, 50C of the present disclosure is vertically positioned, depending on the spatial capabilities of the factories of the manufacturers of the carbon-based material. Regarding the carbon-based material post-modification reactor 50A, 50B, 50C positioned vertically and shown in FIG. 5A through FIG. 5C, its feeding port 52 and discharging port 54 lie at the top (an upstream point) and the bottom (a downstream point) of the carbon-based material post-modification reactor (i.e., the top and the bottom of FIG. 5A through FIG. 5C), respectively, and the intake device is positioned in a way as needed, allowing the ozone to be admitted from the top (an upstream point) of the vertically positioned carbon-based material post-modification reactor 50A, the bottom (a downstream point) of the vertically positioned carbon-based material post-modification reactor 50B, or the side of the vertically positioned carbon-based material post-modification reactor 50C, as indicated by arrow 58a in FIG. 5A, arrow 58b in FIG. 5B, and arrow 58c in FIG. 5C, respectively, so as to mix and react with the carbon-based raw material (indicated by arrows 52a, 52b, 52c) admitted by the feeding port 52 and existing in the reactor. Persons skilled in the art understand that the screw conveying device, the blade rotation direction and inter-blade distance of the carbon-based material post-modification reactor shown in FIG. 5A through FIG. 5C can be adjusted in accordance with the orientation and motor driving direction of the carbon-based material post-modification reactor.

Figure 6A:
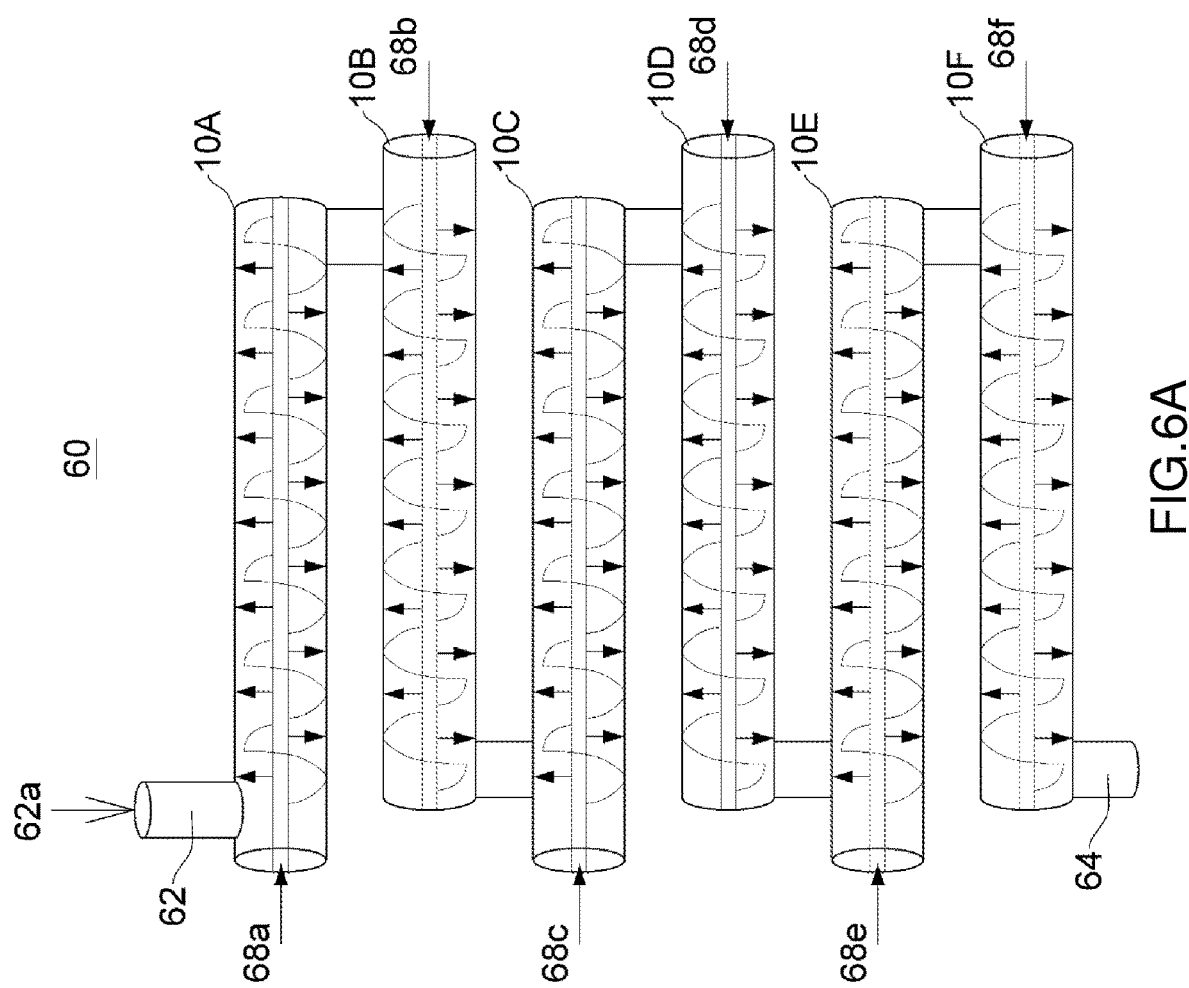
FIG. 6A and FIG. 6B are schematic views of the carbon-based material post-modification reaction device according to an embodiment of the present disclosure.
Figure 6B:
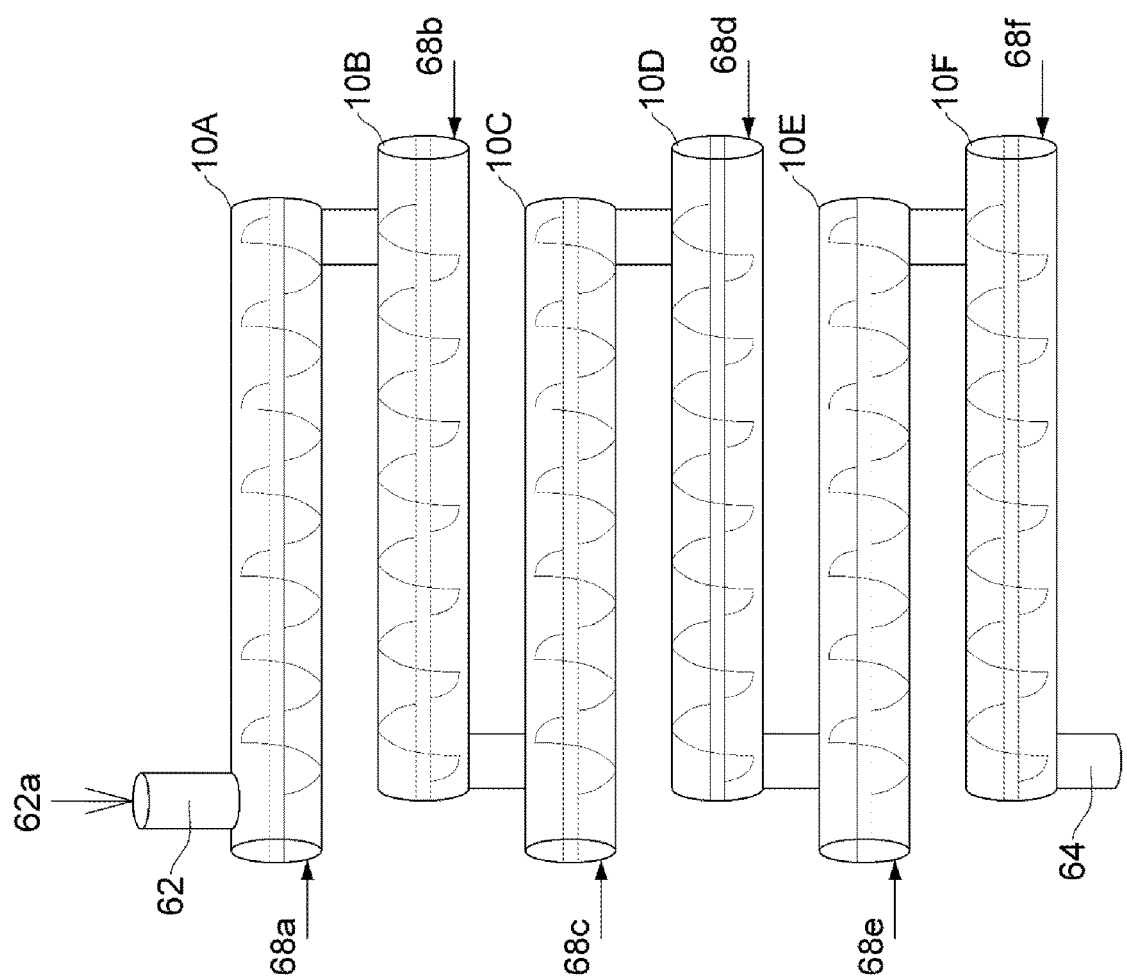

Referring to FIG. 6A and FIG. 6B, there are shown schematic views of the carbon-based material post-modification reaction device according to an embodiment of the present disclosure.

As shown in FIG. 6A, in this embodiment, a carbon-based material post-modification reaction device 60 comprises a general feeding port 62 and a general discharging port 64. The general feeding port 62 is located at an upstream point (for example, the upper left corner of FIG. 6A) of the carbon-based material post-modification reaction device 60, and the carbon-based raw material is fed into the carbon-based material post-modification reaction device 60 via the general feeding port 62. The general discharging port 64 is located at a downstream point (for example, the lower left corner of FIG. 6A) of the carbon-based material post-modification reaction device 60, such that the resultant modified carbon-based material is outputted via the general discharging port 64 and then undergoes a grinding and/or packaging process as needed.

According to the present disclosure, the carbon-based material post-modification reaction device 60 comprises a plurality of (six, for example, in this embodiment) aforesaid carbon-based material post-modification reactors 10A to 10F connected in series. Regarding the carbon-based material post-modification reaction device 60, the discharging port of an upstream reactor (for example, the carbon-based material post-modification reactor 10A shown in FIG. 6A) among the plurality of carbon-based material post-modification reactors 10A to 10F is connected to the feeding port of a downstream reactor (for example, the carbon-based material post-modification reactor 10B shown in FIG. 6A) among the plurality of carbon-based material post-modification reactors 10A to 10F to thereby achieve series connection and fluidic communication of the plurality of carbon-based material post-modification reactors 10A to 10F between the general feeding port 62 and general discharging port 64. Thus, the carbon-based raw material (indicated by arrow 62a) admitted by the general feeding port 62 is, within the carbon-based material post-modification reaction device 60, forwardly conveyed, reversely conveyed and turned over by the screw conveying device to thereby evenly mixing and reacting with the ozone admitted by the intake device (admitted, in this embodiment, by the injection holes on the shaft portions of the reactors respectively, as indicated by arrows 68a to 68f) and existing in the reaction device. The shaft portions of the screw conveying devices of the carbon-based material post-modification reactors 10A to 10F are each coupled to a motor (not shown). The shaft portions are driven by the motors, respectively, to drive the outer spiral blade groups and inner spiral blade groups of the screw conveying devices to simultaneously forwardly convey, reversely convey and turn over the carbon-based raw material inside the carbon-based material post-modification reactors. In this embodiment, the number of the carbon-based material post-modification reactors of the carbon-based material post-modification reaction device 60 can be adjusted according to the height and area of the factories, whereas the carbon-based material post-modification reactors 10A to 10F are identical to the aforesaid carbon-based material post-modification reactor 10 in terms of internal constituent elements and operation and thus are, for the sake of brevity, not described again. The plurality of carbon-based material post-modification reactors connected in series effectively increase the time period during which the reaction between the carbon-based raw material and ozone takes place, thereby further enhancing the effect of modification.

Alternatively, the intake device is disposed at one end of the lower portion of the carbon-based material post-modification reactors 10A to 10F to admit ozone. The ozone thus admitted mixes and reacts with the carbon-based raw material inside the carbon-based material post-modification reactors 10A~10F, as shown in FIG. 6B.

Understandably, the number and orientations of the reactors in the carbon-based material post-modification reaction device of the present disclosure as well as the design of the intake devices and the intake directions in the reactors in the carbon-based material post-modification reaction device of the present disclosure can be combined and changed as needed.

Figure 7:
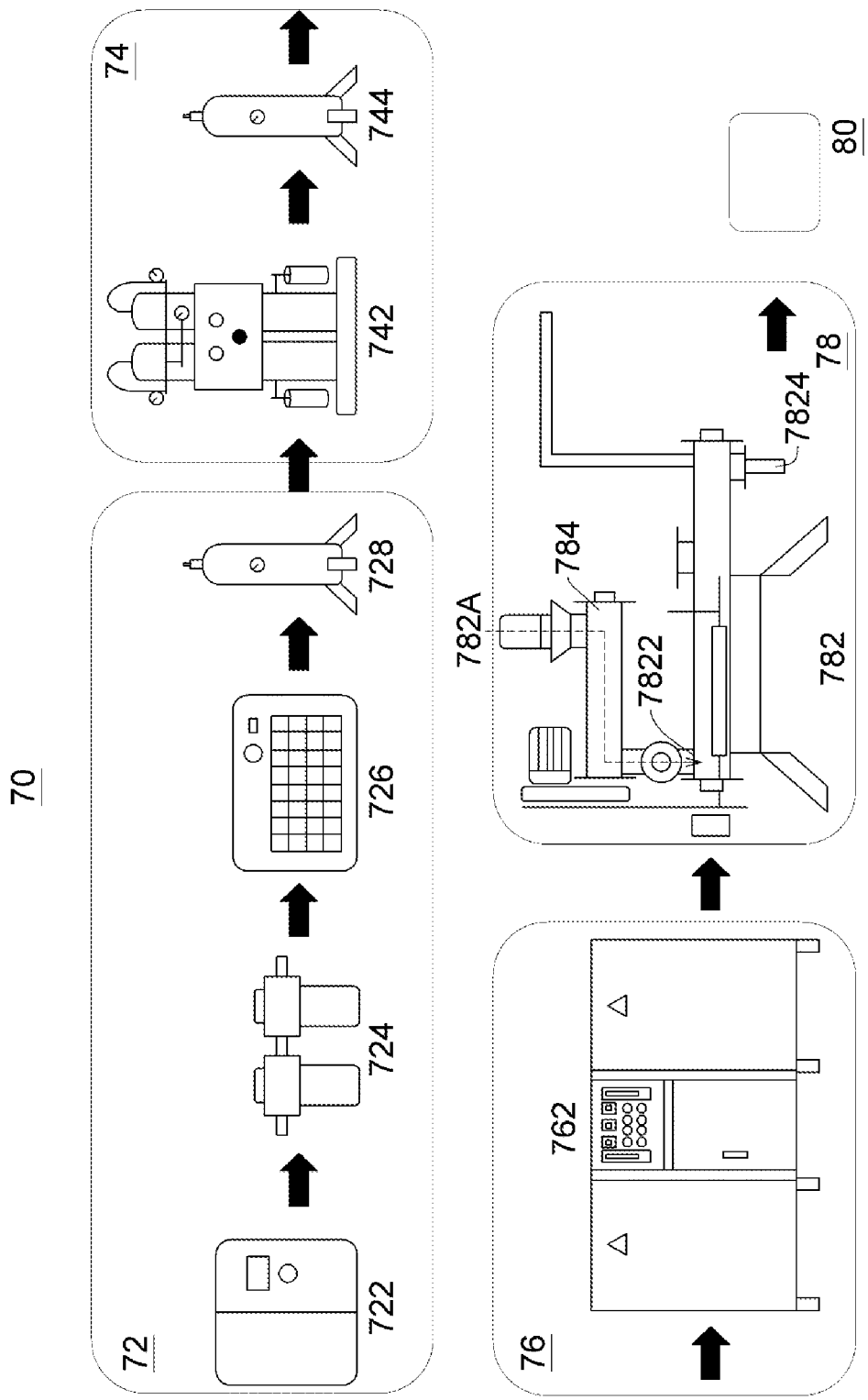
FIG. 7 is a schematic view of the carbon-based material post-modification processing system according to an embodiment of the present disclosure.

Referring to FIG. 7, there is shown a schematic view of the carbon-based material post-modification processing system according to an embodiment of the present disclosure. As shown in FIG. 7, the carbon-based material post-modification processing system 70 of the present disclosure comprises: an air compression unit 72 for receiving and compressing air to produce a compressed air; an oxygen gas producing unit 74 for receiving the compressed air and producing a concentrated oxygen gas from the compressed air; an ozone producing unit 76 for receiving the concentrated oxygen gas and producing ozone gas from the concentrated oxygen gas; and a modification unit 78 for receiving the ozone gas produced by the ozone producing unit and causing the ozone gas and a carbon-based raw material to mix and react so as to produce a modified carbon-based material and output it. The air compression unit 72 comprises, but is not limited to, an air compression device 722, a control unit 724, a drying unit 726 (for example, a refrigeration and drying device) and an air tank 728. After the inputted air has been compressed by the air compression device 722 and dried by the drying unit 726, it is introduced into the air tank 728 for storage and subsequent use in the manufacturing process. The control unit 724 controls the flow rate and flow speed of the compressed air and performs air treatment (i.e., filtration, adjustment of pressure, and application of lubricants), in real time, to protect pipelines from wears and tears which will otherwise bring about impurities, thereby allowing the quality of the compressed air to meet actual needs for the manufacturing process. The compressed air compressed and dried by the air compression unit 72 is inputted to the oxygen gas producing unit 74. The oxygen gas producing unit 74 is, for example, a molecular sieve device 742, and is adapted to separate the oxygen gas and nitrogen gas in the compressed air to thereby produce concentrated oxygen gas with a concentration as high as 90%. The oxygen gas producing unit 74 further comprises an oxygen gas tank 744 for storing the concentrated oxygen gas to facilitate its subsequent use in the manufacturing process. The concentrated oxygen gas produced by the oxygen gas producing unit 74 is further inputted to the ozone producing unit 76 which comprises a high-voltage discharge device 762 capable of releasing energy for use in breaking the molecular bonds of the concentrated oxygen gas molecules to produce ozone (03) gas. By adjusting the gas flow rate and processing performance of the ozone producing unit 76, it is feasible to change the flow rate and concentration of the ozone gas thus produced in order to meet the needs for subsequent reactions. The ozone gas thus produced is introduced into the carbon-based material post-modification reactor (device) 782 of the modification unit 78 to mix and react with the carbon-based raw material 782A.

According to an embodiment of the present disclosure, the modification unit 78 comprises the horizontally-positioned carbon-based material post-modification reactor 10 shown in FIG. 1. In another embodiment, the modification unit 78 comprises vertically positioned carbon-based material post-modification reactors 50A-50C shown in FIG. 5A through FIG. 5C. In another embodiment, the modification unit 78 comprises the carbon-based material post-modification reaction device 60 shown in FIG. 6A or FIG. 6B. As mentioned before, the carbon-based material post-modification reaction device 60 comprises a plurality of carbon-based material post-modification reactors connected in series.

According to an embodiment of the present disclosure, the carbon-based material post-modification reaction system 70 further comprises a feeding device 784. The feeding device 784 is in fluid communication with the feeding port 7822 of the carbon-based material post-modification reactor (device) 782 of the modification unit 78 to feed a carbon-based raw material into the carbon-based material post-modification reactor (device) 782 of the modification unit 78. In addition, the carbon-based material post-modification reaction system 70 of the present disclosure further comprises a grinding unit 80. The modified carbon-based material outputted from the discharging port 7824 of the carbon-based material post-modification reactor (device) 782 of the modification unit 78 is inputted to the grinding unit 80 for grinding, so as to be packaged and outputted after meeting specifications required for carbon-based material product application.

Figure 8:
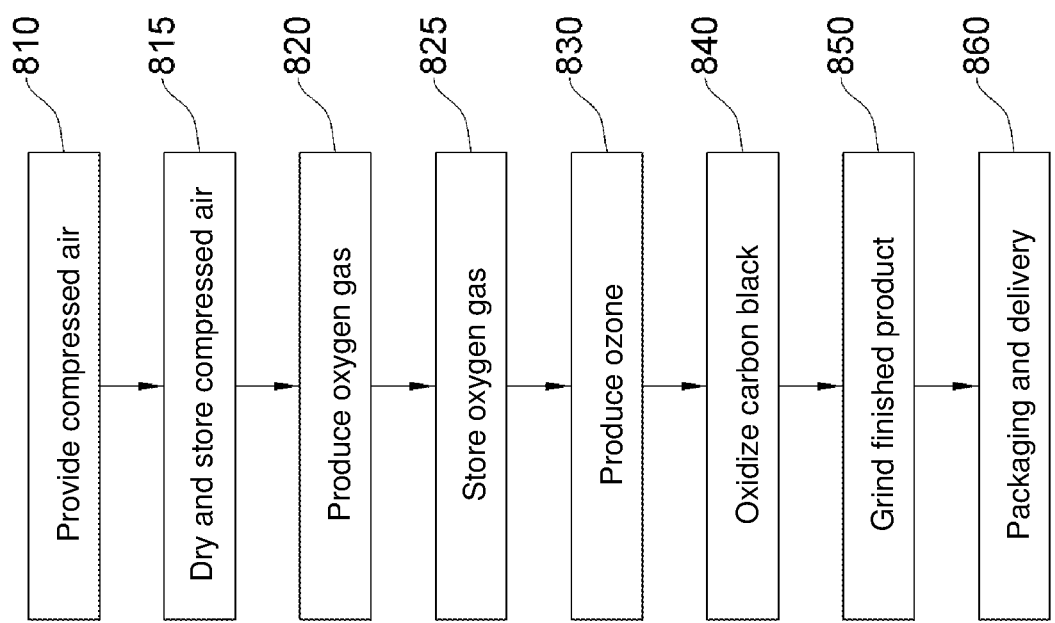
FIG. 8 is a schematic view of the process flow of a carbon-based material post-modification processing method according to an embodiment of the present disclosure.

Referring to FIG. 8, there is shown a schematic view of the process flow of a carbon-based material post-modification processing method according to an embodiment of the present disclosure. The method of the present disclosure comprises the steps as follows: compressing the inputted air to provide a compressed air (step 810); drying and storing the compressed air as needed (step 815), for example, but is not limited to, drying the compressed air with a refrigeration drying device and storing it in an air tank, and then, for example, separating the nitrogen gas and oxygen gas in the compressed air with a molecular sieve device to produce a concentrated oxygen gas (step 820); storing the concentrated oxygen gas thus produced, as needed (step 825); producing an ozone gas from the concentrated oxygen gas by high-voltage discharge (step 830); allowing the produced ozone gas to pass through a carbon-based raw material (for example, introducing the produced ozone gas into the carbon-based material post-modification reactor via the intake device) to thereby mixing and reacting with the carbon-based raw material for a predetermined time period to produce a modified carbon-based material (step 840) (in step 840, it is feasible to further control the flow rate and/or concentration of the ozone gas passing through the carbon-based raw material with a view to obtaining the modified carbon-based material product of required properties, as needed); grinding the modified carbon-based material as needed (step 850); and carrying out packaging and outputting (step 860).

The present disclosure provides a novel carbon-based material post-modification reactor (device), a carbon-based material post-modification processing system having the post-modification reactor (device), and a related method involving the post-modification reactor (device), to carry out a continuous manufacturing process and facilitate the manufacturing process control with a view to producing a modified carbon-based material product of required properties.

According to the present disclosure, the number of the carbon-based material post-modification reactors connected in series can be increased to meet actual processing needs, so as to prolong the reaction time which the carbon-based raw material in the reactors undergoes. By adjusting the feeding frequency of the carbon-based raw material (for example, raw carbon black) at the feeding port, it is feasible to adjust the production yield per unit time of the modified carbon-based material (for example, modified carbon black). Furthermore, in the carbon-based material post-modification reactors of the present disclosure, the positions and features (for example, the number and positions of the injection holes) of the intake devices for introducing ozone gas into the reactors can be adjusted as needed, such that the ozone gas thus introduced is uniformly distributed inside the reactors to mix and react with the carbon-based raw material. By adjusting the gas flow rate and processing performance in the ozone producing unit of the carbon-based material post-modification reaction system of the present disclosure, it is feasible to adjust the flow rate and concentration of the ozone gas being introduced into the reactors. By adjusting the operating frequency of a motor coupled to the screw conveying device, it is feasible to adjust the efficiency of turning over the carbon-based material in the reactors, so as to enhance the quality of the modified carbon-based material thus manufactured. Since the present disclosure entails performing post-modification processing on the manufactured carbon-based raw material (for example, raw carbon black, activated charcoal, carbon nanotubes, graphene and carbon fiber) in a continuous manufacturing process, the present disclosure is effective in adjusting various condition parameters of the post-modification reaction in real time to thereby effectively enhancing the quality of the modified carbon-based material product and its production efficiency.

Although the present disclosure is disclosed above by embodiments, the embodiments are not restrictive of the present disclosure. Changes and modifications made by persons skilled in the art to the embodiments without departing from the spirit and scope of the present disclosure must be deemed falling within the scope of the claims of the present disclosure. Identical or similar elements in different embodiments or elements denoted by identical reference numerals in different embodiments have identical physical or chemical properties. In addition, under appropriate conditions, the aforesaid embodiments of the present disclosure can be replaced by each other or combined but are not restricted to the specific embodiments described above. Connection relationship between a specific element and another element described in an embodiment is also applicable to any other embodiments and shall be deemed falling within the appended claims of the present disclosure.

What is claimed is:

1. A carbon-based material post-modification reactor, comprising:
   a feeding port located at a point upstream from the carbon-based material post-modification reactor and adapted to feed a carbon-based raw material into the reactor;
   a discharging port located at a point downstream from the carbon-based material post-modification reactor and adapted to output a modified carbon-based material;
   a screw conveying device disposed in the carbon-based material post-modification reactor to simultaneously convey and turn over the carbon-based raw material admitted by the feeding port, between the feeding port and the discharging port, the screw conveying device comprising:
      a shaft portion coupled to a motor and driven by the motor;
      an inner spiral blade group comprising a plurality of inner spiral blades disposed equidistantly at a first portion of the shaft portion and extended radially from the shaft portion, wherein the first portion of the shaft portion is positioned proximate to the feeding port; and
      an outer spiral blade group, comprising:
         a plurality of short rods disposed equidistantly at the shaft portion and extended radially from the shaft portion; and
         a plurality of outer spiral blades surrounding spirally around the shaft portion and disposed equidistantly at the shaft portion, wherein the plurality of short rods each have an end connected to a corresponding one of the plurality of outer spiral blades; and
   an intake device for inputting ozone gas to the interior of the carbon-based material post-modification reactor.

2. The carbon-based material post-modification reactor of claim 1, wherein the outer spiral blade group further comprises a part of a plurality of connection blades each connected between at least two outer spiral blades of the outer spiral blade group.

3. The carbon-based material post-modification reactor of claim 1, wherein the inner spiral blade group is a right-hand turning spiral blade group, and the outer spiral blade group is a left-hand turning spiral blade group.

4. The carbon-based material post-modification reactor of claim 1, wherein the outer spiral blade group has a first inter-blade distance, and the inner spiral blade group has a second inter-blade distance greater than the first inter-blade distance.

5. The carbon-based material post-modification reactor of claim 4, wherein the first inter-blade distance ranges from 80 mm to 120 mm, and the second inter-blade distance ranges from 100 mm to 150 mm.

6. The carbon-based material post-modification reactor of claim 1, wherein the shaft portion is of a length ranging from 1500 mm to 15000 mm.

7. The carbon-based material post-modification reactor of claim 6, wherein the first portion of the shaft portion is of a length ranging from 1000 mm to 10000 mm.

8. The carbon-based material post-modification reactor of claim 1, wherein the carbon-based material post-modification reactor is of an aspect ratio ranging from 3 to 8.

9. The carbon-based material post-modification reactor of claim 1, wherein the plurality of inner spiral blades of the inner spiral blade group each has a diameter ranging from 90 mm to 170 mm.

10. The carbon-based material post-modification reactor of claim 1, wherein a first inner spiral blade among the plurality of inner spiral blades and a front end of the shaft portion are separated by a first distance ranging from 0 to two-thirds of the length of the shaft portion.

11. The carbon-based material post-modification reactor of claim 1, wherein the intake device comprises a plurality of injection holes, and ozone gas from the intake device reaches the interior of the carbon-based material post-modification reactor via the plurality of injection holes.

12. The carbon-based material post-modification reactor of claim 1, wherein the intake device is disposed at an end of the carbon-based material post-modification reactor, below the feeding port in the carbon-based material post-modification reactor, or below the carbon-based material post-modification reactor, or forms from the shaft portion directly.

13. The carbon-based material post-modification reactor of claim 1, further comprising a temperature control device coupled to the carbon-based material post-modification reactor to regulate temperature inside the carbon-based material post-modification reactor.

14. The carbon-based material post-modification reactor of claim 1, wherein the carbon-based raw material is one of carbon black, activated charcoal, carbon nanotubes, graphene and carbon fiber.

15. A carbon-based material post-modification reaction device, comprising:
a general feeding port located at a point upstream from the carbon-based material post-modification reaction device and adapted to feed a carbon-based raw material into the reaction device;
a general discharging port located at a point downstream from the carbon-based material post-modification reaction device and adapted to output a modified carbon-based material; and
a plurality of said carbon-based material post-modification reactors of claim 1, wherein the discharging port of an upstream one of the plurality of carbon-based material post-modification reactors is connected to the feeding port of a downstream one of the plurality of carbon-based material post-modification reactors, wherein, between the general feeding port and the general discharging port, the plurality of carbon-based material post-modification reactors are connected in series, in fluid communication with each other, coupled to and driven by the motors, respectively, to simultaneously convey and turn over the carbon-based raw material in the carbon-based material post-modification reactors.

16. The carbon-based material post-modification reaction device of claim 15, wherein the respective intake devices of the plurality of carbon-based material post-modification reactors are fluidically coupled to a common ozone producing unit.

17. The carbon-based material post-modification reaction device of claim 15, wherein the carbon-based raw material is one of carbon black, activated charcoal, carbon nanotubes, graphene and carbon fiber.

18. A carbon-based material post-modification processing system, comprising:
an air compression unit for receiving and compressing air to produce a compressed air;
an oxygen gas producing unit for receiving the compressed air and producing a concentrated oxygen gas from the compressed air;
an ozone producing unit for receiving the concentrated oxygen gas and producing an ozone gas from the concentrated oxygen gas; and
a modification unit for receiving the ozone gas produced by the ozone producing unit and causing combination of the ozone gas and a carbon-based raw material and reaction therebetween to produce a modified carbon-based material, wherein the modification unit comprises the carbon-based material post-modification reactor of claim 15.

19. A carbon-based material post-modification processing system, comprising:
an air compression unit for receiving and compressing air to produce a compressed air;
an oxygen gas producing unit for receiving the compressed air and producing a concentrated oxygen gas from the compressed air;
an ozone producing unit for receiving the concentrated oxygen gas and producing an ozone gas from the concentrated oxygen gas; and
a modification unit for receiving the ozone gas produced by the ozone producing unit and causing combination of the ozone gas and a carbon-based raw material and reaction therebetween to produce a modified carbon-based material, wherein the modification unit comprises the carbon-based material post-modification reactor of claim 1.

20. The carbon-based material post-modification processing system of claim 19, further comprising a drying unit disposed between the air compression unit and the oxygen gas producing unit to dry the compressed air.

21. The carbon-based material post-modification processing system of claim 20, further comprising an air tank disposed between the drying unit and the oxygen gas producing unit to store the dried compressed air.

22. The carbon-based material post-modification processing system of claim 19, wherein the oxygen gas producing unit is a molecular sieve device for separating the oxygen gas and nitrogen gas in the compressed air to produce the concentrated oxygen gas.

23. The carbon-based material post-modification processing system of claim 19, further comprising an oxygen gas tank disposed between the oxygen gas producing unit and the ozone producing unit to store the concentrated oxygen gas.

24. The carbon-based material post-modification processing system of claim 19, wherein the ozone producing unit is a high-voltage discharge device.

25. The carbon-based material post-modification processing system of claim 19, further comprising a feeding device for feeding the carbon-based raw material into the modification unit.

26. The carbon-based material post-modification processing system of claim 19, further comprising a grinding device for grinding the modified carbon-based material outputted from the modification unit.

27. The carbon-based material post-modification processing system of claim 19, wherein the carbon-based raw material is one of carbon black, activated charcoal, carbon nanotubes, graphene and carbon fiber.

28. A carbon-based material post-modification processing method, comprising the steps of:
  (a) providing a compressed air;
  (b) separating a concentrated oxygen gas from the compressed air;
  (c) producing an ozone gas from the concentrated oxygen gas by high-voltage discharge; and
  (d) causing the ozone gas to pass through a carbon-based raw material and combine and react with the carbon-based raw material for a predetermined time period to produce a modified carbon-based material.

29. The method of claim 28, wherein, after step (a), the method further comprises a step (a1) of drying and/or storing the compressed air.

30. The method of claim 28, wherein, after step (b), the method further comprises a step (b1) of storing the concentrated oxygen gas.

31. The method of claim 28, wherein, after step (c), the method further comprises a step (c1) of controlling flow rate and/or concentration of the ozone gas passing through the carbon-based raw material.

\* \* \* \* \*